Patented Nov. 8, 1938

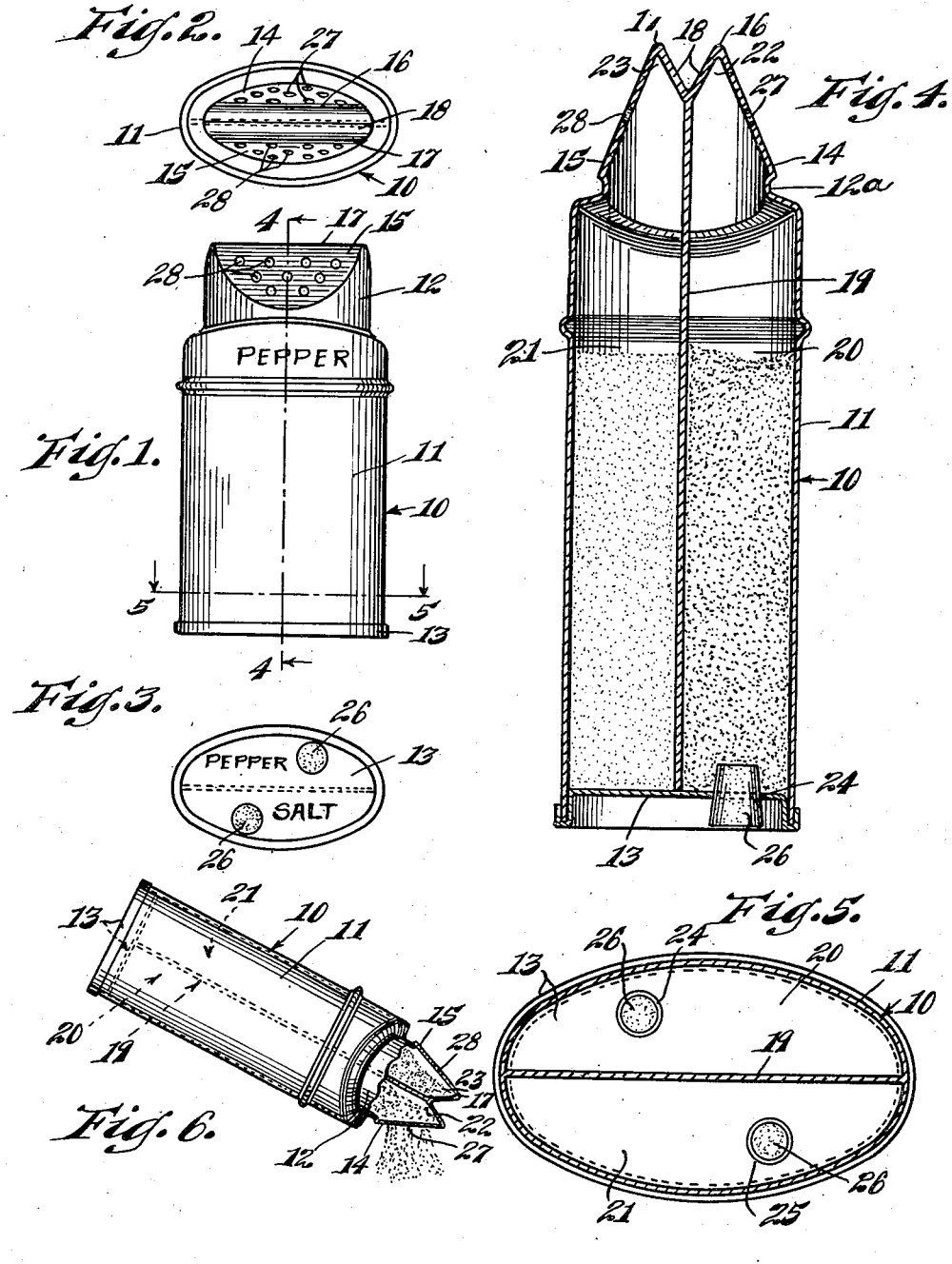

2,135,848

UNITED STATES PATENT OFFICE 2,135,848

SALT AND PEPPER SHAKER AND THE LIKE

Peter F. Sandstrom, Chicago, Ill., assignor, by mesne assignments, of one-half to Albert R. Johnson, Maywood, Ill.

Application April 25, 1936, Serial No. 76,353

2 Claims. (Cl. 65—45)

This invention relates to salt and pepper shakers and the like and more particularly to a combination article for two or more condiments.

An object is to provide a simple, practical, and inexpensive device of the character described.

Another object is to provide an improved combination shaker for salt and pepper and the like.

Another object is to provide a combined salt and pepper shaker in which either the salt or pepper or both may be dispensed at one time.

Other objects and advantages will be apparent and brought out more fully in the following specification, reference being had to the accompanying drawing, in which:

Fig. 1 is a side view of a salt and pepper shaker embodying my invention;

Figs. 2 and 3 are respectively top and bottom views of the same;

Fig. 4 is an enlarged sectional elevation of the same, taken on the line 4—4 of Fig. 1;

Fig. 5 is a further enlarged plan section, taken on the line 5—5 of Fig. 1; and

Fig. 6 is a view partially broken away, showing the device in operation.

Referring more particularly to the drawing, I show a shaker device comprising a container 10 having a body portion 11, a shaker head 12, an internal shoulder 12a, and a base member 13. The head portion has a flat pitched surface 14 and a second flat pitched surface 15, the surface 14 having an upper edge 16, and the surface 15 having an upper edge 17. A V-shaped member 18 joins the edges 16 and 17 with a partition wall 19 which divides the container 10 into two chambers 20 and 21. The member 18 is so arranged that pockets 22 and 23 are formed between surfaces 14 and 15 and wall 19. Apertures 24 and 25 are formed in base member 13 by which the chambers may be filled with the condiments as desired, plugs 26 being provided to close said apertures. A plurality of apertures 27 are provided in surface 14 and a plurality of apertures 28 are provided in surface 15.

It will be understood that the chambers 20 and 21 will be filled with such different condiments as salt and pepper or otherwise, as desired.

The operation of the device should be obvious. When the container is held in the position shown in Fig. 6 it will be apparent that the condiment in chamber 20, which is the lower one, will readily flow out through apertures 27, or if necessary a slight shaking may be required. In this position the condiment in the chamber 21 will be maintained therein, some of the same being held in pocket 17, and none of the same will be dispensed from the apertures 28 since these apertures are at the upper side of the chamber. A like result will of course occur when the device is reversed, the condiment in chamber 21 being dispensed and that in chamber 20 being retained.

If, however, it is desired to dispense both of the condiments simultaneously, the device may be inclined or shaken with the partition wall 19 in a vertical plane, whereupon some of the apertures 27 and 28 will permit the contained condiments to be dispensed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A container comprising a body portion, a base member, a dispensing head having a plurality of apertured dispensing walls, said walls having a meeting edge, and a partition wall extending from said meeting edge to said base, said dispensing walls converging towards said partition wall and having angularly disposed portions forming pockets therewith, said angularly disposed portions forming angles with said dispensing walls and said partition wall respectively.

2. A container comprising a body portion, a base member, a dispensing head having a plurality of apertured dispensing walls, said walls having substantially reversed bent portions converging to a meeting edge and forming pockets, and a partition wall extending from said base to said meeting edge.

PETER F. SANDSTROM.